United States Patent
Shin et al.

(10) Patent No.: US 12,542,137 B2
(45) Date of Patent: Feb. 3, 2026

(54) MULTI-PERSON LLM ASSISTANT INTERACTIONS

(71) Applicant: GOOGLE LLC, Mountain View, CA (US)

(72) Inventors: Dongeek Shin, San Jose, CA (US); Anupam Pathak, San Carlos, CA (US)

(73) Assignee: GOOGLE LLC, Mountain View, CA (US)

( * ) Notice: Subject to any disclaimer, the term of this patent is extended or adjusted under 35 U.S.C. 154(b) by 126 days.

(21) Appl. No.: 18/236,249

(22) Filed: Aug. 21, 2023

(65) Prior Publication Data

US 2025/0069604 A1 Feb. 27, 2025

(51) Int. Cl.
  *G10L 17/22* (2013.01)
  *G10L 17/02* (2013.01)
  *G10L 17/18* (2013.01)
  *G10L 25/54* (2013.01)

(52) U.S. Cl.
  CPC .............. *G10L 17/22* (2013.01); *G10L 17/02* (2013.01); *G10L 17/18* (2013.01); *G10L 25/54* (2013.01)

(58) Field of Classification Search
  None
  See application file for complete search history.

(56) References Cited

U.S. PATENT DOCUMENTS

| | | | |
|---|---|---|---|
| 10,431,216 B1 * | 10/2019 | Lemon | H04L 51/10 |
| 2015/0066494 A1 | 3/2015 | Salvador et al. | |
| 2015/0179168 A1 | 6/2015 | Hakkani-Tur et al. | |
| 2015/0279360 A1 * | 10/2015 | Mengibar | G06F 40/205 704/257 |
| 2020/0372899 A1 | 11/2020 | Aronowitz et al. | |
| 2021/0407520 A1 | 12/2021 | Neckermann | |
| 2022/0101161 A1 | 3/2022 | Goel | |
| 2022/0189465 A1 | 6/2022 | Sharifi | |
| 2022/0366914 A1 | 11/2022 | Moreno et al. | |
| 2024/0144949 A1 * | 5/2024 | Yang | G10L 21/0216 |

(Continued)

OTHER PUBLICATIONS

Wang et al., "Exploiting Prompt Learning with Pre-Trained Language Models for Alzheimer's Disease Detection" arXiv:2210.16539v2 [cs.CL], 5 pages, dated Mar. 13, 2023.

(Continued)

*Primary Examiner* — Pierre Louis Desir
(74) *Attorney, Agent, or Firm* — Gray Ice Higdon

(57) ABSTRACT

Audio data is received via a client device, where the audio data captures a first utterance and a second utterance from different users. The audio data can be processed to determine a first transcription of the first utterance and a second transcription of the second utterance. The audio data can be further processed to determine a first account of a first user that provides the first utterance and a second account of a second user that provides the second utterance. A first natural language description including a first user ID of the first account and the first transcription can be generated, and a second natural language description including a second user ID of the second account and the second transcription can be generated. A generative model can be applied to process the first and natural language descriptions, to generate a response responsive to the first and second utterances.

16 Claims, 7 Drawing Sheets

(56) References Cited

U.S. PATENT DOCUMENTS

2025/0191592 A1* 6/2025 Hiray ..................... G10L 17/26

OTHER PUBLICATIONS

Ben-David et al., "PADA: Example-based Prompt Learning for on-the-fly Adaptation to Unseen Domains" arXiv:2102.12206v4 [cs.CL], 19 pages, dated Jan. 27, 2022.

European Patent Office; International Search Report and Written Opinion issued in Application No. PCT/US2024/043102; 16 pages; dated Oct. 17, 2024.

* cited by examiner

MULTI-PERSON LLM ASSISTANT INTERACTIONS

BACKGROUND

Humans can engage in human-to-computer dialogs with interactive software applications referred to herein as "interactive assistants" (also referred to as "chatbots," "interactive personal assistants," "intelligent personal assistants," "personal voice assistants," "conversational agents," "automated assistant", "audio assistant", or simply "assistant," etc.). For example, to provide a command or request to an interactive assistant, a human user often provides spoken natural language input (i.e., a spoken utterance), in addition to or instead of textual (e.g., typed) natural language input. The interactive assistant receives and processes an audio signal capturing the spoken natural language input from the user, to generate a speech recognition of the spoken natural language input. Based on the speech recognition of the spoken natural language input, the interactive assistant determines user intent and/or parameters associated with the user intent, to respond to the command or request. For example, the interactive assistant can respond to the command or request of the user by providing responsive user interface output (e.g., audible and/or graphical user interface output), controlling smart device(s), and/or performing other action(s).

The response from the interactive assistant as described above is directed to the command or request of the user, and therefore often lacks flexibility in participating and enhancing a conversation, such as a multi-user conversation that involves the user and one or more additional users. For example, in a conversation involving a first user and a second user, the interactive assistant described above may attempt to provide a response every time a spoken utterance is received from either the first user or the second user, and is unable to appropriately provide a response that enhances the conversation involving the first and second users. For instance, in such a conversation the interactive assistant is unable to wait/decide to provide additional information that is responsive to a first utterance from the first user and that is also responsive to a second utterance from the second user that engages in the conversation with the first user. This can cause the waste of resources such as computing resources and battery resources, as more frequent responses require higher consumption of computing and battery resources.

SUMMARY

Implementations disclosed herein relate to generating a response that is responsive to audio data capturing one or more utterances that are part of a multi-user conversation involving more than one user (i.e., human user). The one or more utterances can be captured from one or more users that participate in the multi-user conversation. The generated response can be rendered to the one or more users via an audio assistant, and can optionally be rendered in a customized voice, to enrich the multi-user conversation with additional information or to transition/shift a topic of the multi-user conversation to another topic. As a non-limiting working example, a first user can be a registered user (i.e., having a first account registered with the audio assistant) of the audio assistant, participating in a multi-user conversation with a second user, where the second user can be another registered user of the audio assistant.

In some cases, the first and/or second users can configure the audio assistant in a multi-user conversation mode that enables the audio assistant to participate in the multi-user conversation. For example, the first or the second user can invoke and trigger the audio assistant in the multi-user conversation mode by speaking a predetermined hotword phrase (e.g., "hey assistant, group chat", "hey group assistant", etc.) and/or by selecting a multi-user conversation model graphical user interface (GUI) element. In some other cases, during a conversation (e.g., the multi-user conversation), audio data can be monitored, with permission from user(s) of the multi-user conversation, for the predetermined hotword phrase (e.g., "hey assistant, group chat", "hey group assistant", etc.), and the audio assistant can be transitioned (e.g., automatically) into the multi-user conversation mode based on the monitoring of the audio data.

When in the multi-user conversation mode, the audio assistant can, when appropriate, generate a response responsive to multiple utterances from different users (or a portion of a conversation that involves multiple users), instead of rigidly responding, in a turn-based manner, to every single utterance the audio assistant receives. This reduces the consumption of computing resources, battery resources, and/or network resources, while enhancing the conversation that involves the multiple users (e.g., the aforementioned first and second users) by providing additional information that supplements the multiple utterances via the audio assistant at appropriate moments.

Continuing with the above non-limiting working example, the first user can provide a first utterance, and the second user can provide a second utterance, where audio data capturing the first utterance and the second utterance can be received by one or more microphones of a client device at which the audio assistant is installed (or accessible). The audio data capturing the first utterance and the second utterance can be processed to determine a first transcription of the first utterance, as well as a second transcription of the second utterance. Additionally, the audio data can be processed to determine a first user account (or first user ID, etc.) associated with the first user and determine a second user account (or second user ID, etc.) associated with the second user. Optionally, in some implementations, the second utterance can be captured subsequent to the first utterance (e.g., can be captured within a certain period of time after the first utterance is captured).

Audio data capturing the first utterance can be processed to generate a first voice vector (may also be referred to as "first speaker embedding"), where the first voice vector can be compared with a plurality of pre-stored speaker embeddings that are stored in association with a plurality of user accounts registered with the audio assistant that is installed at the client device. The plurality of pre-stored speaker embeddings can be respectively generated for a plurality of registered users that respectively own or control the plurality of user accounts. The plurality of pre-stored speaker embeddings, for instance, can include a first pre-stored speaker embedding generated for the first user when the first user registers an account (i.e., a first user account) with the audio assistant, and can include a pre-stored second speaker embedding generated for the second user when the second user registers an account (i.e., a second user account) with the audio assistant. The first voice vector can be determined to correspond to the first user based on, for instance, a distance (cosine distance or Euclidean distance) between the first voice vector and the first pre-stored speaker embedding in a common virtual space satisfying (e.g., less than) a distance threshold.

Similarly, the audio data capturing the second utterance can be processed to generate a second voice vector (may also be referred to as "second speaker embedding"), where the second voice vector can be compared with the plurality of pre-stored speaker embeddings, to determine that a distance (cosine distance or Euclidean distance) between the second voice vector and the second pre-stored speaker embedding (i.e., in the common virtual space) satisfies (i.e., being less than) the distance threshold. In this case, the second voice vector can be determined to correspond to the second user or the account of the second user registered with the audio assistant.

Continuing with the above non-limiting working example, in some implementations, a first natural language description can be generated to include the first transcription (may be referred to as 'transcription 1') and one or more attributes (e.g., name such as "Tom", username, role in an organization/family, age range (e.g., adult or child), music preference, etc.) associated with the first user (or the first user account). For instance, the first natural language description can be in a form of "Tom says 'transcription 1'". Similarly, a second natural language description can be generated to include the second transcription (may be referred to as 'transcription 2') and one or more attributes (e.g., name such as "Jerry", username, role in an organization/family, age range, music preference, etc.) associated with the second user (or the second user account). For instance, the second natural language description can be in a form of "Jerry says 'transcription 2'". The one or more attributes associated with the first user/first user account can be determined via metadata that is stored in association with the first user account. The one or more attributes associated with the second user/second user account can be determined via metadata that is stored in association with the second user account.

Continuing with the above non-limiting working example, the first natural language description and the second natural language description can be combined to generate a composite natural language description (sometimes referred to as "stitched natural language description" or "modified natural language description)". The generated composite natural language description can be in a form of, e.g., "Tom says 'transcription 1'. Jerry says 'transcription 2'". The generated composite natural language description can be processed as input using a trained generative model (e.g., a trained large language model, "LLM"), to generate output indicating a response that is responsive to the audio data capturing the first and second utterances. The response can be rendered audibly (and/or visually) via one or more speakers of the client device (at which the audio assistant is installed at or accessible), in response to the audio data capturing the first and second utterances. In some implementations, the response can be rendered audibly via the audio assistant of the client device, prior to the client device receiving any additional utterance that is in addition to the first and second utterance.

Additionally or alternatively, in some implementations, the aforementioned output can further indicate a confidence score for the response, and a determination can be made, based on the confidence score, as to whether to render the response via the audio assistant. For example, in response to the confidence score being determined to satisfy a confidence threshold (e.g., 0.6), the response can be rendered via the audio assistant in response to the audio data capturing the first and second utterances. Additionally, in response to the confidence score being determined to not satisfy the confidence threshold, the response may not be rendered via the audio assistant. Put another way, the response generated using the LLM may not be rendered in various situations, such as when the confidence score fails to satisfy the confidence threshold.

The above is provided merely as an overview of some implementations. Those and/or other implementations will be disclosed in more detail herein. For instance, in the above non-limiting example, the first user can be a non-registered user of the audio assistant. In this instance, the processing of the audio data capturing the first utterance can result in a "guest" label to be associated with the first utterance, instead of a name or username such as "Tom". Alternatively and/or additionally, the processing of the audio data capturing the first utterance can result in a prediction for additional information of a user (i.e., the first user) that provides the first utterance, and the stitched natural language description can include such prediction (instead of the name or username such as "Tom"). Similarly, the second user can alternatively or additionally be a non-registered user of the audio assistant, and repeated descriptions are not provided herein.

Various implementations can include a non-transitory computer readable storage medium storing instructions executable by a processor to perform a method such as one or more of the methods described herein. Yet other various implementations can include a system including memory and one or more hardware processors operable to execute instructions, stored in the memory, to perform a method such as one or more of the methods described herein.

BRIEF DESCRIPTION OF THE DRAWINGS

The above and other aspects, features, and advantages of certain implementations of the present disclosure will be more apparent from the following description taken in conjunction with the accompanying drawings. In the drawings.

DETAILED DESCRIPTION

The following description with reference to the accompanying drawings is provided for understanding of various implementations of the present disclosure. It's appreciated that different features from different implementations may be combined with and/or exchanged for one another. In addition, those of ordinary skill in the art will recognize that various changes and modifications of the various implementations described herein can be made without departing from the scope and spirit of the present disclosure. Descriptions of well-known or repeated functions and constructions may be omitted for clarity and conciseness.

The terms and words used in the following description and claims are not limited to the bibliographical meanings, and are merely used to enable a clear and consistent understanding of the present disclosure. Accordingly, it should be apparent to those skilled in the art that the following description of various implementations of the present disclosure is provided for the purpose of illustration only and not for the purpose of limiting the present disclosure as defined by the appended claims and their equivalents.

Figure 1A:
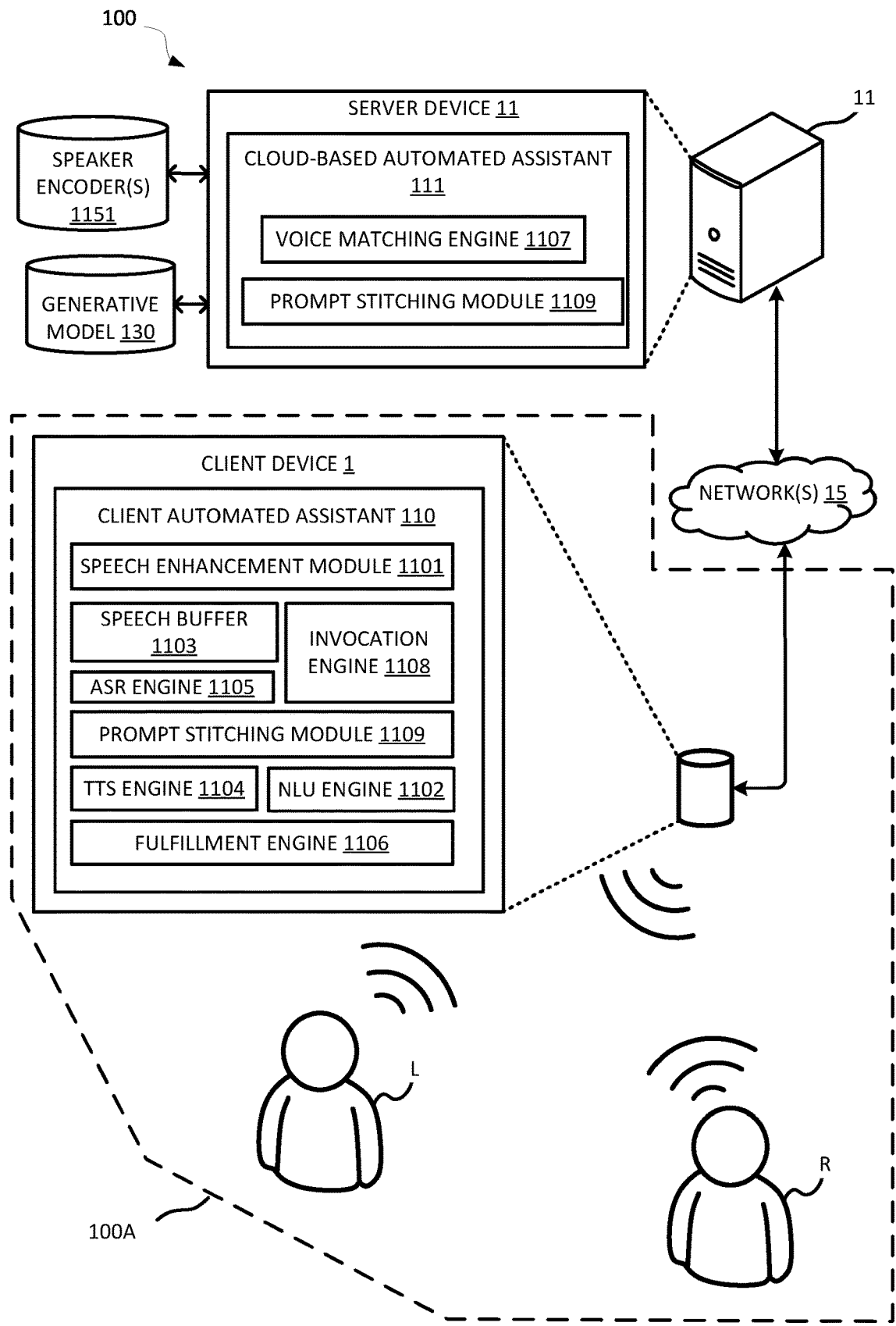
FIG. 1A depicts a block diagram of an example environment that demonstrates various aspects of the present disclosure, and in which implementations disclosed herein can be implemented.
Figure 1B:
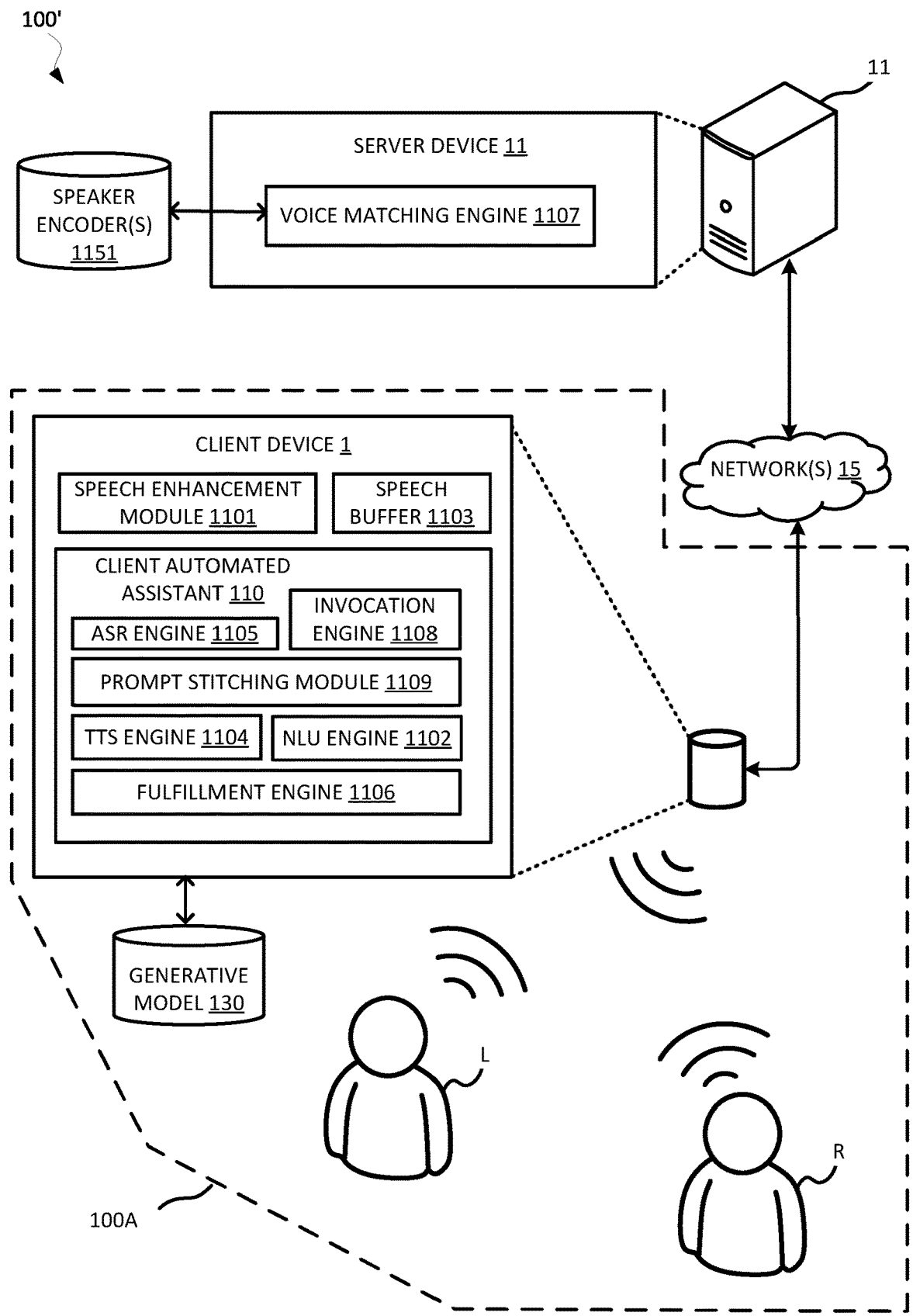
FIG. 1B depicts a block diagram of another example environment that demonstrates various aspects of the present disclosure, and in which implementations disclosed herein can be implemented.

FIG. 1A depicts a block diagram of an example environment 100 that demonstrates various aspects of the present disclosure, and in which implementations disclosed herein can be implemented. FIG. 1B depicts a block diagram of another example environment 100' that demonstrates various aspects of the present disclosure, and in which implementations disclosed herein can be implemented. As shown in FIG. 1A, the environment 100 can include a local environment 100A surrounding one or more users (e.g., user L and/or user R), where the local environment 100A can include a client device 1 installed with a client automated assistant 110 (e.g., audio assistant). The client device 1 can be, for example, a cell phone, a stand-alone interactive speaker, a computer (e.g., laptop, desktop, notebook), a tablet, a robot, a smart appliance (e.g., smart TV), a messaging device, an in-vehicle device (e.g., in-vehicle navigation system or in-vehicle entertainment system), a wearable device (e.g., watch or glasses), a virtual reality (VR) device, an augmented reality (AV) device, or a personal digital assistant (PDA), and the present disclosure is not limited thereto.

In some implementations, optionally, the environment 100 can further include one or more server devices (e.g., a server device 11). The server device 11 can include a cloud-based automated assistant 111. The server device 11 can communicate with the client device 1 via one or more networks 15. The one or more networks 15 can be, or can include, for example, a local area network (LAN), a wide area network (WAN) such as the Internet, and/or any other appropriate network.

The client automated assistant 110 can have a plurality of local components including, for example, a speech enhancement module 1101, a speech buffer 1103, and an automatic speech recognition (ASR) engine 1105. Optionally, the client automated assistant 110 can further include a voice (or speech) matching engine 1107 and/or a prompt stitching engine 1109. Optionally, the client automated assistant 110 can further include a natural language understanding (NLU) engine 1102, a text-to-speech (TTS) engine 1104, and/or a fulfillment engine 1106. The plurality of local components of the client automated assistant 110 can optionally further include an invocation engine 1108. In some implementations, the cloud-based automated assistant 111 can have components the same as or similar to the client automated assistant 110. Repeated descriptions of the components of the cloud-based automated assistant 111 are omitted herein.

In some implementations, the cloud-based automated assistant 111 can have more components than the client automated assistant 110. For example, the voice matching engine 1107 can be included in the cloud-based automated assistant 111 but not included in the client automated assistant 110. In some implementations, the cloud-based automated assistant 111 can have components the same as or similar to the client automated assistant 110 while the components of the cloud-based automated assistant can possess stronger processing capabilities than their counterparts of the client automated assistant 110. It's noted that when combined, the client automated assistant 110 and the cloud-based automated assistant 111 can be referred to as "automated assistant", or in some cases, as "audio assistant".

In some implementations, when the client device 1 is powered on, the client automated assistant 110 can be automatically (i.e., by default) configured in a hotword restricted listening state in which the invocation engine 1108 is activated to process audio data received via the client device 1. The invocation engine 1108, for instance, accesses a hotword detection model to process audio data that captures a spoken utterance as input, to generate an output indicating whether the spoken utterance includes a hotword (e.g., "Assistant"). The hotword detection model can be, for instance, a machine learning model that is trained to detect presence of a particular hotword (e.g., the aforementioned hotword "Assistant") in a given instance of audio data.

The particular hotword (or hotwords) can be customized and pre-configured based on a type or function of the automated assistant. In other words, different automated assistants developed by different developers/parties can have different hotwords pre-configured. In some implementations, the invocation engine 1108 can be utilized to detect pre-configured hotwords (e.g., aforementioned "Hey Assistant, group chat"), where in response to the invocation engine 1108 detecting the pre-configured hotwords ("Hey Assistant, group chat"), the client automated assistant 110 can be configured in the aforementioned multi-user conversation mode. By requiring a user to explicitly invoke the client automated assistant 110 using the hotword(s) before the automated assistant can fully process the spoken utterance, user privacy can be preserved and resources (computational, battery, etc.) can be conserved. It's noted that, in some cases, the client automated assistant 110 may also be invoked without utilization of the hotword(s). For instance, the client automated assistant 110 can be invoked in response to a touch gesture, a touch-free gesture, presence detection, and/or a gaze of the user.

In some implementations, the client automated assistant 110 can automatically enter the multi-user conversation mode where the client automated assistant 110 listens to a conversation involving one or more users and provides response(s) that enhance the conversation. For example, the client automated assistant 110 can enter the multi-user conversation mode automatically in response to two or more users being detected from an instance of audio data captured by one or more microphones of the client device 1. In some implementations, a user of the client automated assistant 110 can control/configure the client automated assistant 110 in the multi-user conversation mode, for example, by selecting a selectable element representing the multi-user conversation mode via a particular user interface of the client automated assistant 110. The particular user interface of the client automated assistant 110 can be rendered via the client device 1 (e.g., a stand-alone speaker), or via another client device (e.g., cellphone) that is in communication with the client device 1.

In various implementations, the speech enhancement module 1101 can perform speech enhancement on speech audio data, to extract speech signal(s) and/or to remove noise mixed with the speech signal(s) in the speech audio data. By performing speech enhancement, a signal-to-noise ratio (SNR) of the speech audio data can be improved, to enhance subsequent speech recognition of one or more speeches captured in the speech audio data. As an example, referring to FIG. 1A, the speech audio data can be audio data capturing a first utterance from user L and a second utterance from user R. In this example, the speech enhancement module 1101 can perform speech enhancement on the audio data capturing the first utterance from user L and the second utterance from user R, to improve SNR for a first speech signal corresponding to the first utterance and to improve SNR for a second speech signal corresponding to the second utterance.

Continuing with the above example, a distance and/or a direction of the user L with respect to the client device 1 can be determined, and speech enhancement on the first speech signal that corresponds to the first utterance can be performed by the speech enhancement module 1101 based on the distance and/or direction of the user L with respect to the client device 1. Similarly, a distance and/or a direction of the user R with respect to the client device 1 can be determined, and speech enhancement on the second speech signal that corresponds to the second utterance can be performed by the speech enhancement module 1101 based on the distance and/or direction of the user R with respect to the client device 1.

In various implementations, the speech buffer 1103 can be part of a data storage of the client device 1, where speeches having a plurality of frames can be accumulated at the speech buffer 1103. As a non-limiting example, the audio data capturing the first and second utterances can be divided into a first portion (of the audio data) capturing the first utterance and a second portion (of the audio data) capturing the second utterance. In this example, the speech buffer 1103 can store (e.g., temporarily) the divided audio data (i.e., the first portion of the audio data that captures the first utterance of user L, and the second portion of the audio data that captures the second utterance of user R). Or, alternatively, the speech buffer 1103 can store the audio data capturing the first and second utterances. In this case, the audio data capturing the first and second utterances can be processed by the ASR engine 1105 using an ASR model, to generate a speech recognition (may also be referred to as "transcription") of the audio data capturing the first and second utterances.

If the speech buffer 1103 stores the divided audio data (i.e., the first portion of the audio data that captures the first utterance and the second portion of the audio data that captures the second utterance), the ASR engine 1105 can process the first portion of the audio data that captures the first utterance, to generate a first transcription of the first utterance. The ASR engine 1105 can process the second portion of the audio data that captures the second utterance, to generate a second transcription of the second utterance.

In some implementations, the first portion of the audio data that captures the first utterance and the second portion of the audio data that captures the second utterance can be forwarded to a voice matching engine 1107 of the cloud-based automated assistant 111. The first portion of the audio data that captures the first utterance can be processed by the voice matching engine 1107 using a speaker encoder model (or other trained machine learning model), to generate a first speaker embedding that corresponds to the first utterance. The first speaker embedding can represent voice characteristics of user L. The second portion of the audio data that captures the second utterance can be processed by the voice matching engine 1107 using the speaker encoder model (or other trained machine learning model), to generate a second speaker embedding that corresponds to the second utterance. The second speaker embedding can represent voice characteristics of user R. As a non-limiting example, the speaker encoder model can be, for instance, a deep neural network (DNN). In this non-limiting example, the first speaker embedding can be output from a last hidden layer of the DNN that is used to process the first utterance, and the second speaker embedding can be output from a last hidden layer of the DNN that is used to process the second utterance.

In some implementations, the voice matching engine 1107 can compare the first speaker embedding with a plurality of pre-stored speaker embeddings associated with the client automated assistant 110 that is installed at the client device 1. The plurality of pre-stored speaker embeddings can each correspond to a user account registered with the client automated assistant 110 installed at the client device 1. For instance, the plurality of pre-stored speaker embeddings can include a first pre-stored speaker embedding for a user account of user L registered with the client automated assistant 110 at the client device 1, and/or can include a second pre-stored speaker embedding for a user account of user R registered with the client automated assistant 110 at the client device 1.

In the above instance, the voice matching engine 1107 can compare the first speaker embedding with the plurality of pre-stored speaker embeddings, to determine that the first speaker embedding matches the first pre-stored speaker embedding, so as to determine that the first utterance (from which the first speaker embedding is generated) is from user L (whose user account of the client automated assistant 110 is associated with the first pre-stored speaker embedding). Similarly, the voice matching engine 1107 can compare the second speaker embedding with the plurality of pre-stored speaker embeddings, to determine that the second speaker embedding matches the second pre-stored speaker embedding, so as to determine that the second utterance (from which the second speaker embedding is generated) is from user R (whose user account of the client automated assistant 110 is associated with the second pre-stored speaker embedding). The voice matching engine 1107 can generate a matching result, e.g., <first utterance, user L> and <second utterance, user R>, where the generated matching result can be sent to the client automated assistant 110. It's noted that the matching result can identify a name of user L and a name of user R, or can alternatively or additionally identify an account name (or account ID) associated with the user account of user L (or user R) registered with the client automated assistant 110 at the client device 1.

The prompt stitching engine 1109 of the client device 1 can process the matching result and the transcription of the audio data that captures the first and second utterances, to generate a modified transcription (sometimes referred to as a "composite transcription", "stitched transcription", or "generative model prompt") that includes: the first transcription of the first utterance, identified by the name (or user ID, account name, etc.) of user L that spoke the first utterance; and the second transcription of the second utterance, identified by the name (or user ID, account name, etc.) of user R that spoke the second utterance.

In some cases, when the audio data captures only one utterance (e.g., "The weather is really nice today" from user with a first name "Alice" as shown in a user profile for the client automated assistant 110, the prompt stitching engine 1109 can generate, based on a matching result indicating that a speaker embedding derived from the utterance of "The weather is really nice today" matches a user account of the user with the first name "Alice", a generative model prompt (e.g., Alice says "The weather is really nice today") for processing by the generative model 130, where the generative model prompt can include a transcription of the utterance of "The weather is really nice today" and user information of the user "Alice".

The modified transcription can be processed as input, using a generative model 130, to generate an output, where the output indicates a natural language response responsive to the audio data capturing the first and second utterance. The generative model 130 can be included in, or be accessible via, the client device 1. In some implementations, the generative model 130 can be included in, or be accessible via, the client automated assistant 110. In some implementations, the generative model 130 can be included in, or be accessible via, the server device 11.

In some implementations, the output can further indicate a confidence score for the response. Depending on the confidence score, the natural language response may or may not be rendered to user L and user R in response to the audio data capturing the first and second utterances. If the natural language response is determined to be rendered (e.g., based on the confidence score satisfying a confidence threshold, which can, for instance, be a numeric value of 0.6), the natural language response can be processed using a vocoder (not illustrated in FIG. 1A or FIG. 1B), to generate corresponding audio data for the natural language response, for the generated audio data to be rendered audibly in a particular/customized voice. The particular voice can be, for instance, customized by user R or user L. Alternatively or additionally, the particular voice can have a tone determined based on the audio data capturing the first and second utterance.

In some implementations, the confidence threshold can be dynamically adjusted during a conversation or can be adjusted on a conversation-by-conversation basis. In some implementations, the confidence threshold can be adjusted based on a silence period following the last utterance (e.g., the second utterance from user R subsequent to the first utterance from user L). As a non-limiting example, the confidence threshold can be higher (e.g., 0.9) for the silence period being 1.5 seconds or less. Then, if the silence period continues (e.g., no additional utterance is received subsequent to the second utterance) and becomes 1.5-3.0 seconds, the confidence threshold can be reduced to 0.8. The confidence threshold can be further reduced to approximately 0.7 if the silence period continues and becomes 3.0-4.0 seconds. It's noted that in this non-limiting example, the confidence threshold may not be lowered to a predefined limit (e.g., a "floor" threshold of about 0.7), which means that if the confidence score is less than 0.7, no response will be rendered no matter how long the silence period is.

In the above example, the response that has confidence score of 0.85 will not be rendered if the silence period is determined to be 1.5 seconds (since the confidence threshold of 0.9 is not satisfied), but the response can be rendered when the silence period continues and becomes over 1.5 seconds (e.g., 1.51 seconds) because the confidence threshold is lowered to 0.8 then.

In some implementations, additionally or alternatively, the confidence threshold can be adjusted based on a total number of human speakers/users that participate in the multi-user conversation, or based on a total number of active users that participate in the multi-user conversation. For instance, the confidence threshold can be configured to be 0.9 for more than five human speakers, 0.8 for 4 human speakers, 0.75 for 3 human speakers, and 0.65 for 2 speakers. This reduces the chance of the multi-user conversation being unexpectedly interrupted by improper response from the audio assistant, to ensure good user experience in interacting with the audio assistant.

In various implementations, the NLU engine 1102 can determine semantic meaning(s) of audio (e.g., the aforementioned audio data capturing the spoken utterance 101) and/or a text (e.g., the aforementioned speech recognition that is converted by the ASR engine 1105 from the audio data), and decompose the determined semantic meaning(s) to determine intent(s) and/or parameter(s) for an assistant action (e.g., generating/displaying responsive content, controlling a third-party device to perform a third-party action). For instance, the NLU engine 1102 can process the speech recognition (e.g., "Assistant, turn on the TV") of a spoken utterance, to determine an intent (e.g., turn on a device) of the user and one or more parameters (the device being "TV") for the assistant action of "turn on TV".

In some implementations, the NLU engine 1102 can process, using a NLU machine learning model, the aforementioned speech recognition (e.g., "Assistant, turn on the TV") as input. In processing the aforementioned speech recognition, the NLU machine learning model can generate an output that indicates the aforementioned intent and/or the one or more parameters. Such output of the NLU machine learning model can further indicate or include a NLU score indicating whether the intent (e.g., turn on <device>) and/or the one or more parameters (e.g., device name for the device: "TV") are feasible.

In some implementations, when the NLU score is below a predetermined NLU score threshold, the NLU engine 1102 can determine that the intent (e.g., turn on <device>) and/or the one or more parameters (e.g., device name for the device: "TV") indicated by the output of the NLU machine learning model, are unresolved for the spoken utterance 101. When the user intent and/or the associated parameter(s) are determined as being unresolved, a default message can be rendered to the user. The default message, e.g., "sorry, I don't understand, please try again", can be rendered audibly and/or visually.

In some implementations, the fulfillment engine 1106 can receive the intent and/or parameter(s) of the intent, to fulfill the intent by performing a corresponding assistant action. As a non-limiting example, the fulfillment engine can receive an intent of Internet search and search parameter of "Weather today in Louisville?", to cause a search engine of the client device 11 to search the Internet for "Weather today in Louisville?". In this example, the fulfillment engine 1106 can fulfill the intent by: (1) causing the search engine to search the Internet for the user query, i.e., "Weather today in Louisville?"), (2) generating fulfillment information (e.g., "it's cloudy outside, with a temperature of 26° C."), based on a search result (e.g., "Louisville, KY, Monday 11:00 am, cloudy, 26° C.") of the search, and/or (3) rendering the fulfillment information to the user of the client device 1. As another non-limiting example, the fulfillment engine 1106 can receive an intent and/or parameter(s) for an assistant action that causes a thermostat in the living room to set room temperature at 72 F. In this example, the fulfillment engine 1106 can fulfill the intent by generating and forwarding a control signal to the thermostat in the living room, where the control signal causes the thermostat to set the room temperature at 72 F.

Optionally, when the NLU engine cannot resolve the intent(s) and/or cannot determine all parameter(s) for the intent(s), to fulfill an assistant action, the fulfillment engine 1106 can generate a default response, such as "Sorry, I don't understand. Please try again.

In some implementations, the TTS engine 1104 can convert a text (or natural language content/description) to a synthesized speech using a particular voice. The synthesized speech, for instance, can be generated by using one or more trained speech synthesis neural network models (e.g., the aforementioned vocoder) to process the text. The synthesized speech can be audibly rendered via hardware speaker (s) of the client device 1 (e.g., a stand-alone speaker) or via another device (e.g., a cell phone).

Figure 2:
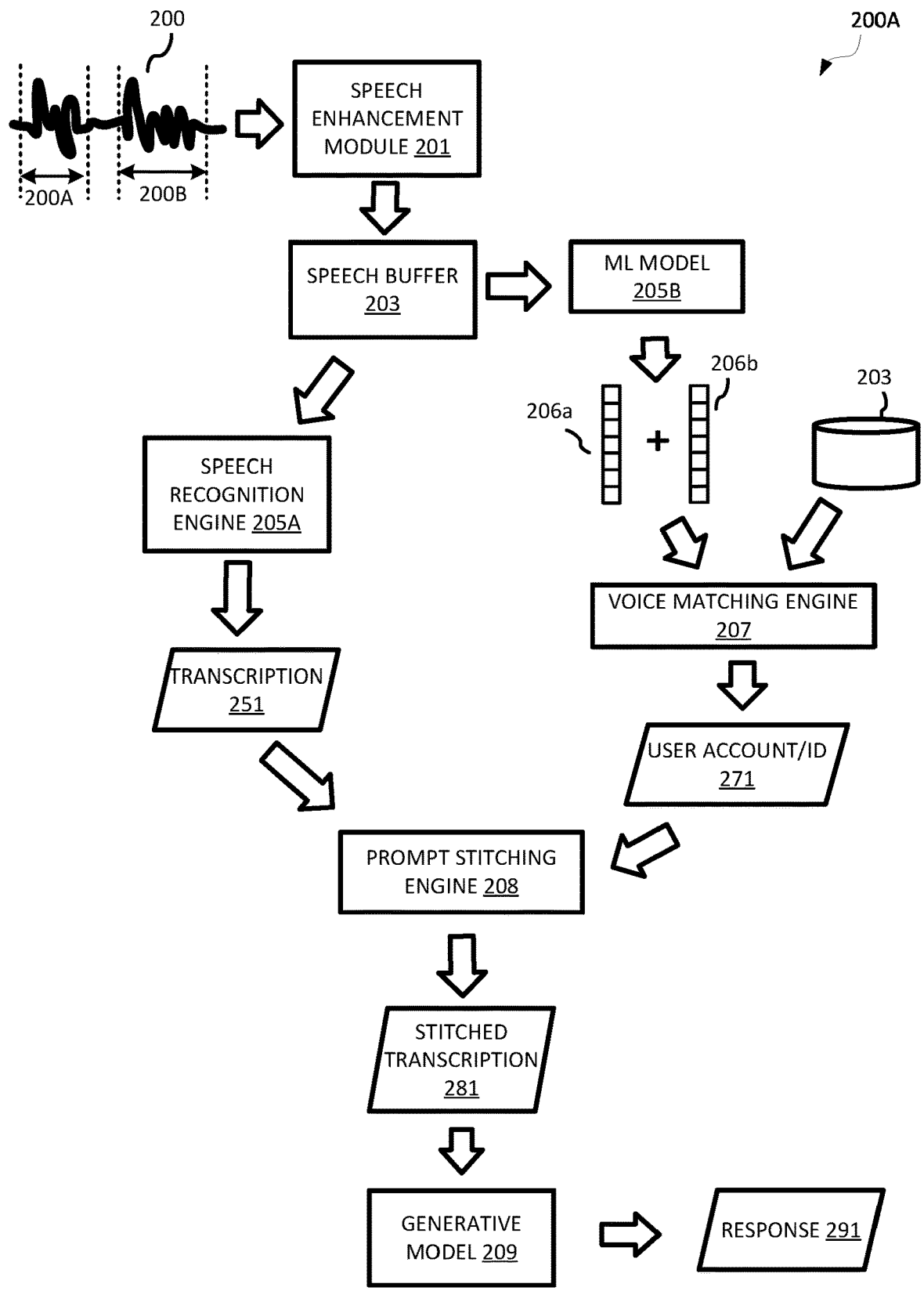
FIG. 2 is a flow diagram showing generation of a response responsive to audio data capturing a first and a second utterances, in accordance with various implementations.

FIG. 2 provides a flow diagram showing the processing of an audio signal 200 capturing a first utterance and a second utterance, in accordance with various implementations. As shown in FIG. 2, the audio signal 200 can include a first portion 200A corresponding to the first utterance and include a second portion 200B corresponding to the second utterance, where the first utterance can be captured from a first user and the second utterance can be captured from a second user different from the first user. The audio signal 200 can be captured via one or more microphones of a client device, where the client device can include an audio assistant having a speech enhancement module 201 that processes the audio signal 200 to remove noise from the audio signal 200, so that SNR of the audio signal 200 can be enhanced. In some implementations, the audio signal 200 can be segmented into one or more segments, including: a first audio segment that corresponds to the first utterance, and a second audio segment that corresponds to the second utterance. The audio signal 200 can be segmented, for example, based on detection of a change in speakers (from the first user to the second user), and/or based on classification of audio frames. In some implementations, the one or more segments can include a third audio segment classified as non-speech, environment sound, silence, music, etc. As a non-limiting example, the third audio segment succeeds the first audio segment and precedes the second audio segment.

The first audio segment and the second audio segment that respectively capture a speech (e.g., the first utterance and the second utterance) can be stored (e.g., temporarily) in a speech buffer 203 of the audio assistant installed at the client device. In some implementations, the third audio segment and any additional audio segment, of the one or more segments, that corresponds to non-speech may not be stored in the speech buffer 203.

Further referring to FIG. 2, the first audio segment can be processed using a speech recognition engine 205A (e.g., the aforementioned ASR engine) of the audio assistant, to generate a first transcription of the first utterance. The second audio segment can be processed using the speech recognition engine 205A to generate a second transcription of the second utterance. In some implementations, the speech recognition engine 205A can be an on-device engine, meaning that the speech recognition engine 205A is included in, and can be accessed locally, at the client device.

In some implementations, if the audio signal 200 is not segmented, the audio signal 200 can be processed using the speech enhancement module 201 to generate an enhanced audio signal, where the enhanced audio signal can be stored in the speech buffer 203. The enhanced audio signal can be processed using the speech recognition engine 205A, to generate a transcription 251. A first portion of the transcription 251 can be a transcription of the first utterance, and a second portion of the transcription 251 can be a transcription of the second utterance.

In some implementations, the first audio segment and the second audio segment stored in the speech buffer 203 can be transmitted to a server device that is in communication with the client device (or more specifically, the audio assistant).

In some implementations, the server device can include or otherwise access a machine learning (ML) model 205B (e.g., a speaker encoder). The first audio segment can be processed as input, using the ML model 205B, to generate a first speaker embedding 206a for the first audio segment. The first speaker embedding can be, for instance, in a form of a N-dimensional vector. The second audio segment can be processed as input, using the ML model 205B (or another ML model accessible via the server device), to generate a second speaker embedding 206b for the second audio segment. The second speaker embedding can be, for instance, in a form of a N-dimensional vector.

In some implementations, the first user that spoke the first utterance can be a registered user of the audio assistant that is installed at the client device, and/or the second user that spoke the second utterance can be a registered user of the audio assistant that is installed at the client device. By being a registered user of the audio assistant that is installed at the client device, the first or second user can have a corresponding pre-stored speaker embedding stored in associated with the audio assistant. The pre-stored speaker embedding for the first user (or the second user) can be generated based on processing one or more utterances from the first user (or from the second user) that are required to be spoke by the first user (or the second user) when registering a corresponding first (or second) user account of the audio assistant.

In some implementations, the audio assistant installed at the client device can be associated with a plurality of pre-stored speaker embeddings, where the plurality of pre-stored speaker embeddings can include a first pre-stored speaker embedding for the first user, a second pre-stored speaker embedding for the second user, and/or one or more additional pre-stored speaker embeddings for one or more additional users in addition to the first user and the second user.

As a non-limiting example, the plurality of pre-stored speaker embeddings can include: the first pre-stored speaker embedding for the first user, and the second pre-stored speaker embedding for the second user. In this example, a speech (or voice) matching engine 207 of the server device (or of the client device) can match the aforementioned first speaker embedding (as well as the second speaker embedding) with the plurality of pre-stored speaker embeddings, to generate a matching result.

Continuing with the above non-limiting example, the speech matching engine 207 can match the first speaker embedding with the plurality of pre-stored speaker embeddings, to determine that the first speaker embedding matches the first pre-stored speaker embedding for the first user. The speech matching engine 207 can match the aforementioned second speaker embedding with the plurality of pre-stored speaker embeddings, to determine that the second speaker embedding matches the second pre-stored speaker embedding for the second user. In this example, the matching result can indicate that the first utterance is from the first user based on the first speaker embedding matching the first pre-stored speaker embedding for the first user. The matching result can indicate that the second utterance is from the second user based on the second speaker embedding matching the second pre-stored speaker embedding for the second user.

Alternatively or additionally, the matching result can indicate that the first utterance is associated with a first account of the first user for the audio assistant based on the first speaker embedding matching the first pre-stored speaker embedding for the first user, and further indicate that the second utterance is associated with a second account of the second user for the audio assistant based on the second speaker embedding matching the second pre-stored speaker embedding for the second use Continuing with the above non-limiting example, a prompt stitching engine 208 of the client device can generate a modified transcription 281 based on the first transcription for the first utterance, one or more attributes (e.g., user name, full name of the first user, user ID, etc.) associated with the first account of the first user, the second transcription for the second utterance, and one or more attributes associated with the second account of the second user. The modified transcription 281 can be processed as input, using a trained generative model 209, to generate an output indicating a response 291. The response 291 can be rendered audibly and/or visually in response to the first utterance and in response to the second utterance. The second utterance, in some cases, can be responsive to the first utterance.

Figure 3A:
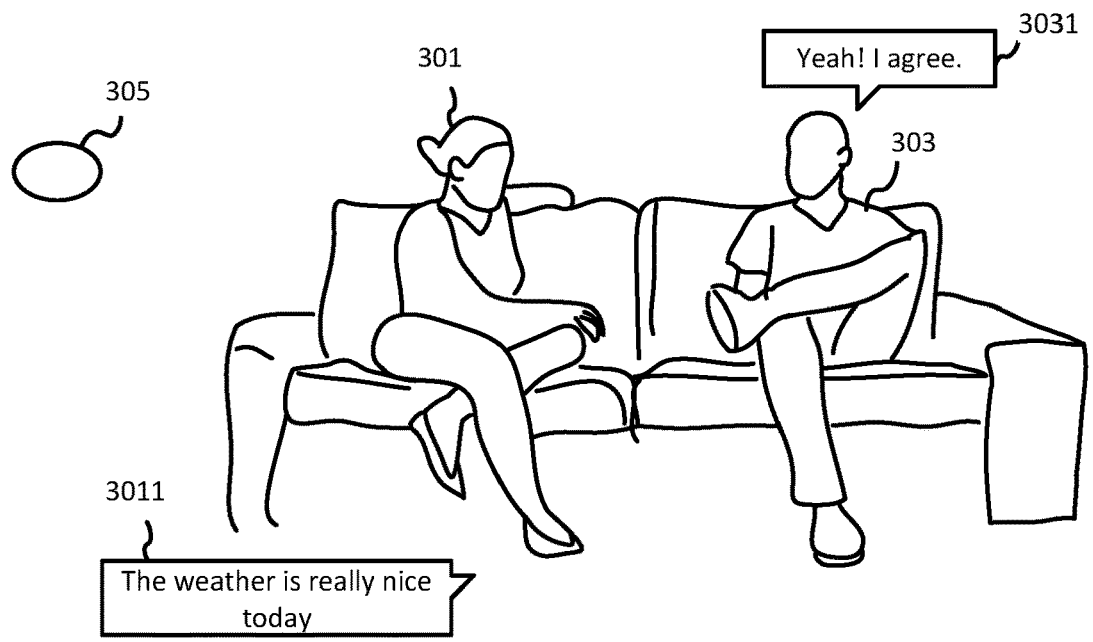
FIG. 3A and FIG. 3B illustrate an example scenario where a response is generated in response to audio data capturing first and second utterances, in accordance with various implementations.
Figure 3B:
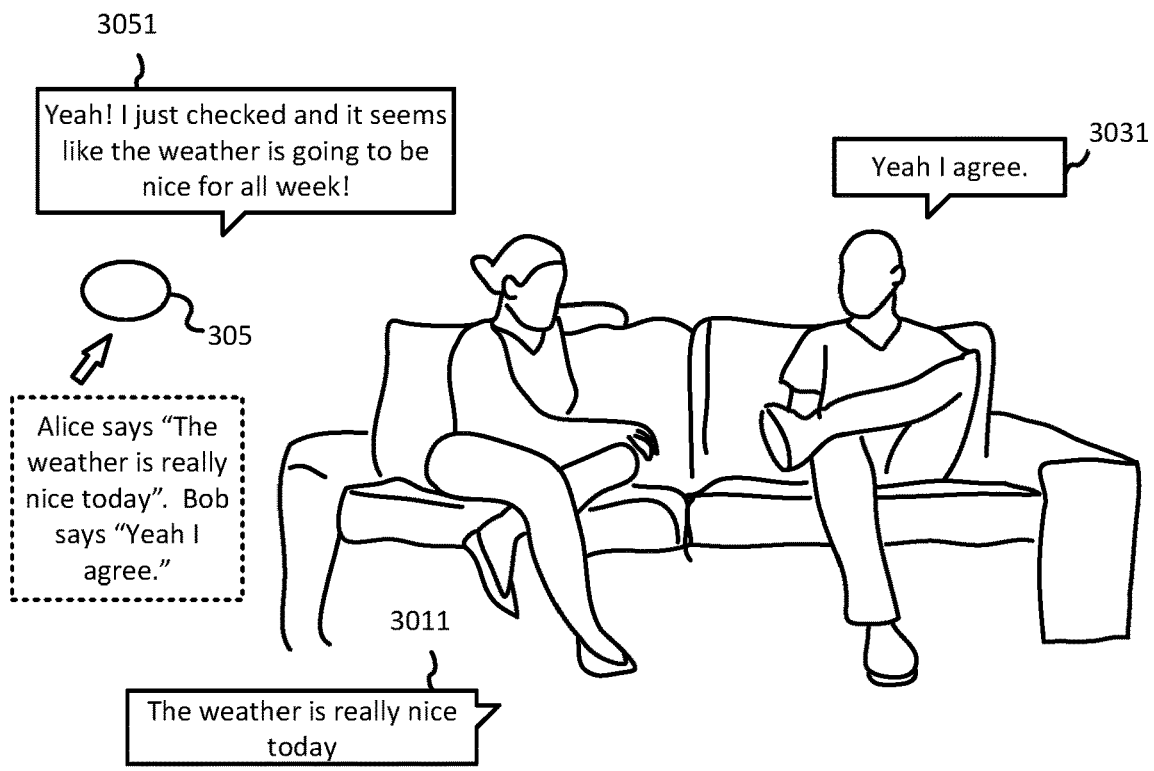

FIGS. 3A and 3B illustrate an example scenario where a response is generated in response to audio data capturing a first and a second utterances, in accordance with various implementations. Referring to FIG. 3A, a first user 301 can engage in a multi-user conversation with a second user 303 (as opposed to engaging in a single-user conversation with an audio assistant 305 installed at a client device). For instance, the first user 301 can initiate the multi-user conversation by providing a first utterance 3011, e.g., "The weather is really nice today." Hearing the first utterance 3011, the second user 303 can responsively provide a second utterance 3031, e.g., "Yeah! I agree". The audio assistant 305 can monitor any audio data received via one or more microphones of the client device. In some implementations, the audio assistant 305 can be manually configured in a multi-conversation mode, to monitor, receive, and process audio data capturing the first utterance 3011 and the second utterance 3031 received via one or more microphones of the client device. In some implementations, the audio assistant 305 can automatically enter the multi-conversation mode, based on determining that the first utterance 3011 and the second utterance 3031 in the captured audio data are from different users.

In some implementations, the audio assistant 305 can include a speech recognition engine that determines a transcription ("The weather is really nice today. Yeah! I agree.") of the audio data that captures the first utterance and the second utterance. In some implementations, the audio data capturing the first utterance and the second utterance can be segmented into a first segment of the audio data that corresponds to the first utterance ("The weather is really nice today") and a second segment of the audio data that corresponds to the second utterance ("Yeah! I agree"). The first segment of the audio data and the second segment of the audio data can be transmitted to a server device in communication with the client device, to be processed using one or more speaker encoders accessible via the server device. For example, the first segment of the audio data can be processed using a speaker encoder of the one or more speaker encoders, to generate a first speaker embedding, and the second segment of the audio data can be processed using a speaker encoder of the one or more speaker encoders, to generate a second speaker embedding.

The first speaker embedding and the second speaker embedding can be respectively compared to a plurality of pre-stored speaker embeddings, where the plurality of pre-stored speaker embeddings each correspond to a registered user account of the audio assistant 305 and are stored in association with the audio assistant 305. Based on the comparison, a first account of the first user 301 registered with the audio assistant 305 can be identified for the first speaker embedding, and a second user account of the second user 303 registered with the audio assistant 305 can be identified for the second speaker embedding.

The transcription (i.e., "The weather is really nice today. Yeah! I agree.") can be modified to generate a modified transcription that includes one or more attributes (e.g., name of the first user, "Alice") associated with the first user account and to include one or more attributes (e.g., name of the first user, "Bob") associated with the second user account. The modified transcription can be, for instance, "Alice says 'The weather is really nice today.' Bob says 'Yeah! I agree.'" Alternatively, when the one or more attributes include a user ID (e.g., user1101 for the first user and user2121 for the second user), the modified transcription can be, for instance, "user1101 says 'The weather is really nice today.' User 2121 says 'Yeah! I agree.'" Alternatively, when the one or more attributes include an identification of a role within an organization (e.g., "father" for the first user and "daughter" for the second user), the modified transcription can be, for instance, "daughter says 'The weather is really nice today.' Father says 'Yeah! I agree.'".

The modified transcription can be processed using a trained generative model (e.g., a large language model, "LLM"), to generate an output indicating a natural language response 3051 to the modified transcription. For instance, the natural language response 3051 can be "Yeah! I just checked and it seems like the weather is going to be nice for all week!", or "Agree with both of you, I just checked and it seems like the weather is going to be nice for all week!". Such natural language response 3051 can be processed using a vocoder to be rendered audibly in a customized voice (See FIG. 3B), in response to the audio data capturing the first utterance 3011 and the second utterance 3031. The natural language response 3051 (e.g., "Yeah! I just checked and it seems like the weather is going to be nice for all week!") provides supplemental information (e.g., "the weather is going to be nice for all week") that supplements (e.g., provide additional information than) the first utterance 3011 ("The weather is really nice today.") and the second utterance 3031 ("Yeah! I agree"). It's noted that, in this case, the LLM may (or may not) access local weather (e.g., as additional input that is in addition to the modified transcription) for the whole week to provide the supplemental information regarding weather conditions ("nice") for all week.

In some implementations, the first user 301 can be a registered user (e.g., "Alice") of the audio assistant 305 having the first account, and the second user 303 can be a guest having no account registered with the audio assistant 305. In this case, the second user 303 can be assigned a "guest" label, and the modified transcription can incorporate the "guest" label and username of the first user 301 into the transcription to become, for instance, "Alice says 'The weather is really nice today.' Guest replies 'Yeah! I agree.'"

Figure 4A:
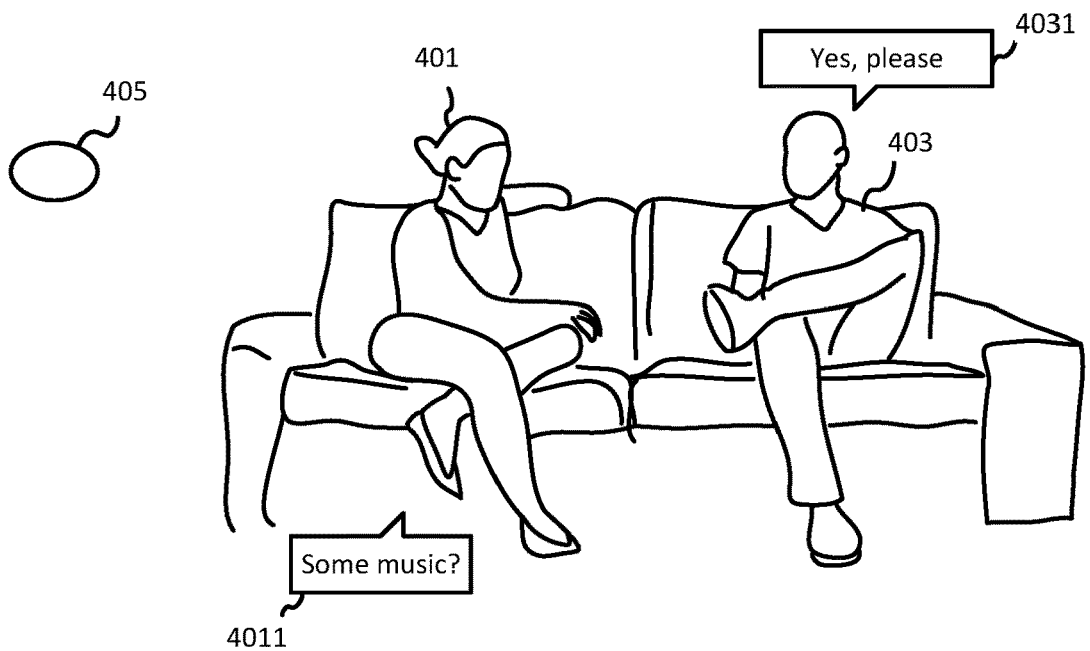
FIG. 4A and FIG. 4B illustrate another example scenario where a response is generated in response to audio data capturing first and second utterances, in accordance with various implementations.
Figure 4B:
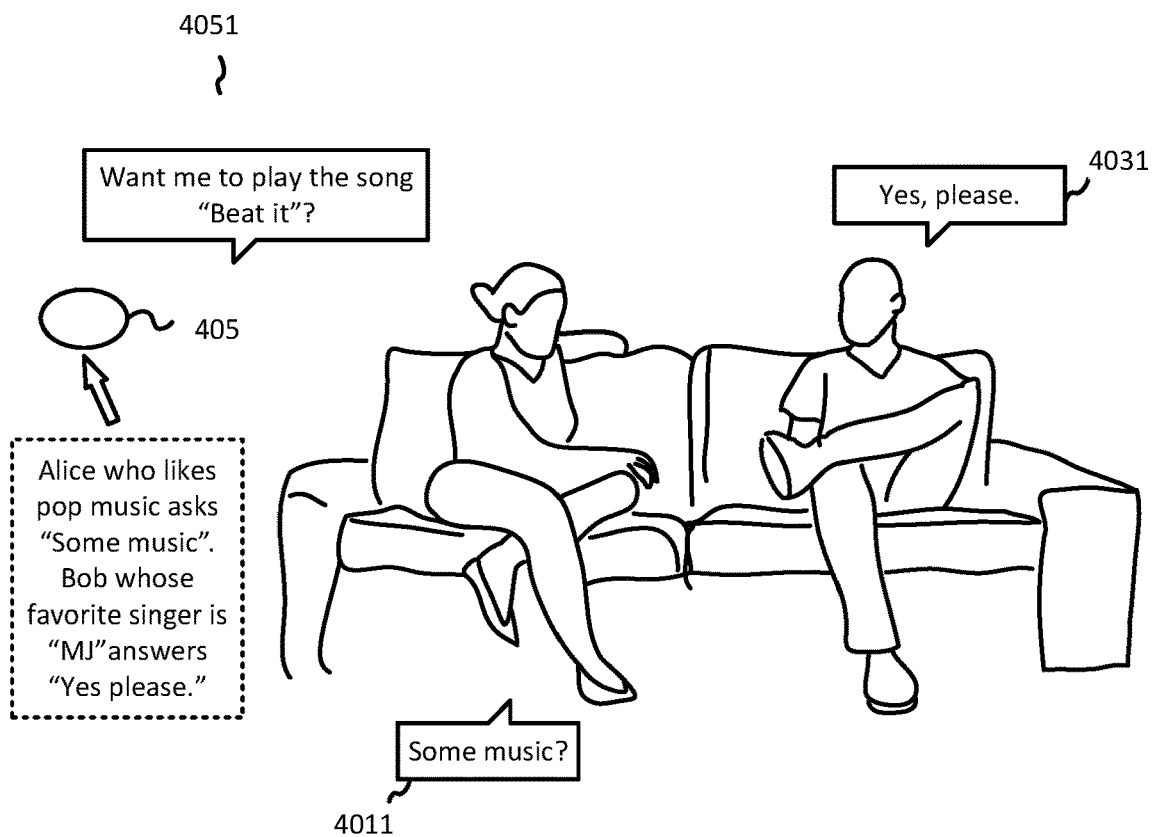

FIGS. 4A and 4B illustrate another example scenario where a response is generated in response to audio data capturing a first and second utterances, in accordance with various implementations. Referring to FIG. 4A, a first user 401 can engage in a multi-user conversation with a second user 403. The first user 401 can provide a first utterance 4011, e.g., "Some music?" Hearing the first utterance 4011, the second user 403 can responsively provide a second utterance 4031, e.g., "Yes, please". The audio assistant 405 can monitor and receive audio data capturing the first utterance 4011 and the second utterance 4031.

In some implementations, the audio assistant 405 can include a speech recognition engine that determines a transcription ("Some music? Yes, please.") of the audio data that captures the first utterance 4011 and the second utterance 4031. In some implementations, the audio data capturing the first utterance 4011 and the second utterance 4031 can be segmented into a first segment of the audio data that corresponds to the first utterance 4011 and a second segment of the audio data that corresponds to the second utterance 4031. The first segment of the audio data can be processed using a speaker encoder, to generate a first speaker embedding. Based on the first speaker embedding, a first user account (e.g., Alice's account) of the audio assistant 405 that is associated with the first segment of the audio data can be determined, and from the first user account, metadata associated with the first user account can be determined.

In many cases, an access level to the determined metadata that is associated with the first user account can be limited or selected by a user (here, the first user) who owns or controls the first user account. As a non-limiting example, the first user can set the access level to "public" so that only public information (or information allowed by the first user to share, such as a public or shared calendar, graduate school, hobby, job title, etc.) of the metadata associated with the first user account can be accessed by the audio assistant 405. Similarly, access level to the determined metadata that is associated with the second user account can be limited or selected by a user (here, the second user) who owns or controls the second user account, and repeated descriptions are not provided herein.

The metadata associated with the first user account can include user preference data, user historical data, and/or other data (e.g., user profile). As a non-limiting example, the user preference data associated with the first user account can include music preference data (e.g., pop music). Alternatively or additionally, the user historical data associated with the first user account can indicate that a user (i.e., the first user) of the first user account listens to a particular song (e.g., song A) most frequently within the latest week (or can indicate that the first user labeled song B as a favorite or that the first user has recently saved song B to a favorite album associated with the audio assistant 305). The metadata can further include other types of user data, and descriptions of the metadata are not limited herein.

Similarly, the second segment of the audio data can be processed using a speaker encoder, to generate a second speaker embedding. Based on the second speaker embedding, a second user account (e.g., Bob's account) of the audio assistant 305 that is associated with the second segment of the audio data can be determined, and from the second user account, metadata associated with the second user account can be determined. The metadata associated with the second user account can include user preference data, user historical data, and/or other data (e.g., a user profile identifying the second user as a member of a rock band, calendar data such as a shared calendar between colleagues, etc.).

For instance, the user preference data associated with the second user account can include music preference data (e.g., favorite singer being "MJ"). Alternatively or additionally, the user historical data (with permission) associated with the second user account can indicate that a user (i.e., the second user) of the second user account has purchased tickets to concerts of jazz music a couple of times within the past three months.

The transcription (i.e., "Some music? Yes, please.") can, for instance, be modified to generate a modified transcription that includes one or more attributes (e.g., music preference data, "pop music") associated with the first user account and to include one or more attributes (e.g., favorite singer being "MJ") associated with the second user account. The modified transcription can be, for instance, "Alice who likes pop music asks 'Some music?' Bob whose favorite singer is "MJ" answers 'Yes, please.'" (if the first user "Alice" and the second user "Bob" are registered users), or can be "First user who likes pop music asks 'Some music?' Second user whose favorite singer is "MJ" answered 'Yes, please.'" (if both the first user and second user are unregistered users). The modified transcription (e.g., "Alice who likes pop music asks 'Some music?' Bob whose favorite singer is "MJ" answered 'Yes, please.'") can be processed using a trained generative model (e.g., a large language model, "LLM"), to generate an output indicating a natural language response to the modified transcription. For instance, the natural language response 4051 can be "Want me to play the song 'Beat it'?". Such natural language response can be processed using a vocoder to be rendered audibly in a customized voice (See FIG. 4B), in response to the audio data capturing the first utterance 4011 and the second utterance 4031. The natural language response 4051 (e.g., "Want me to play the song 'Beat it'?") provides additional information (e.g., suggests a particular song based on both the first user's music preference and the second user's preference in music) that is a response to the first utterance 4011 ("Some music?") and the second utterance 4031 ("Yes, please").

Figure 5:
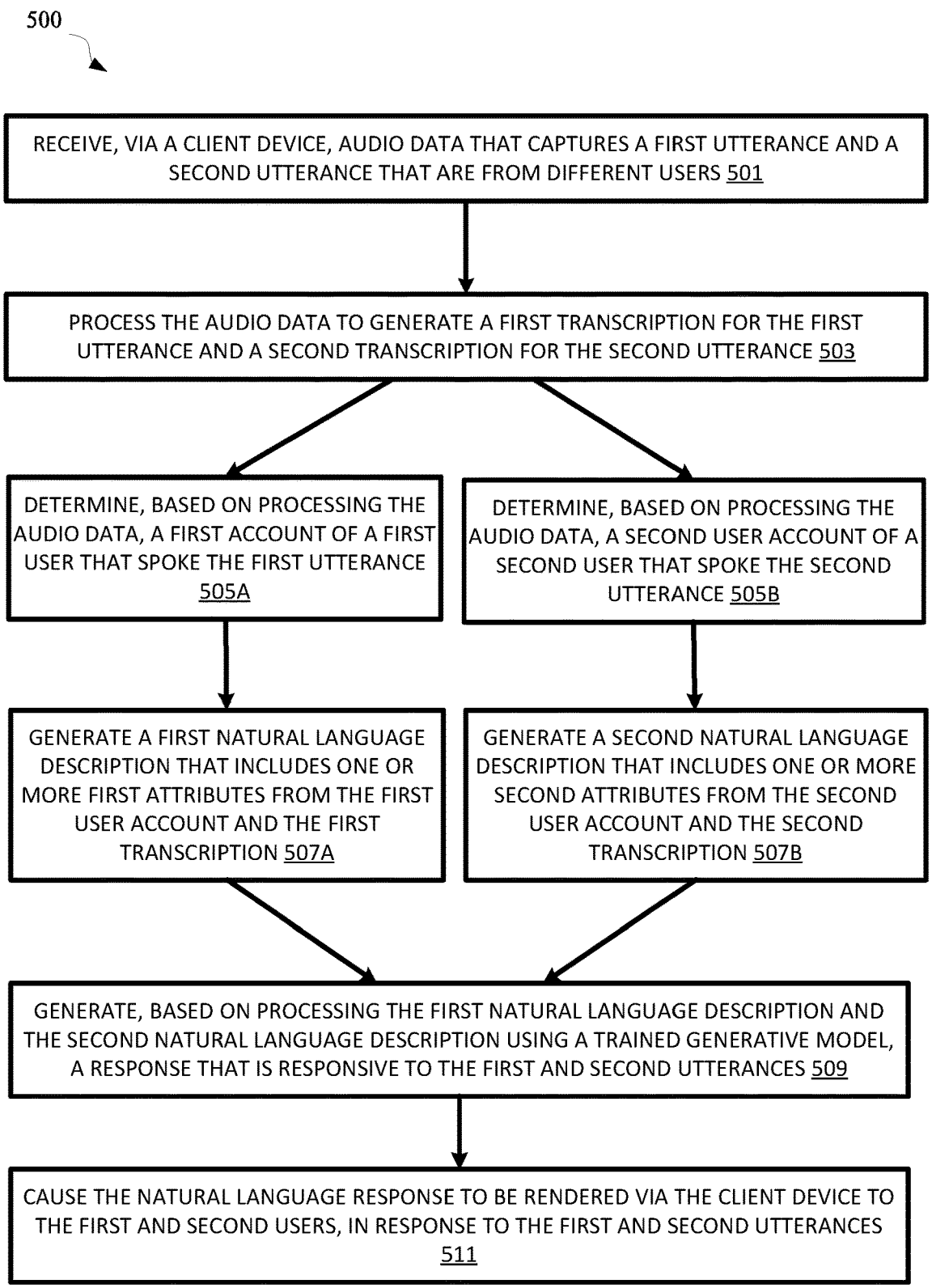
FIG. 5 illustrates an example method for generating a response responsive to audio data capturing first and second utterances, in accordance with various implementations.

FIG. 5 illustrates an example method for generating a response responsive to audio data capturing a first and second utterances, in accordance with various implementations. For convenience, the operations of the method 500 are described with reference to a system that performs the operations. The system of method 500 includes one or more processors and/or other component(s) of a client device and/or of a server device. Moreover, while operations of the method 500 are shown in a particular order, this is not meant to be limiting. One or more operations may be reordered, omitted, or added.

Referring to FIG. 5, in various implementations, at block 501, the system can receive, via a client device, audio data that captures a first utterance and a second utterance that are from different users. As a non-limiting example, the first utterance can be, "When is grandma's birthday, I remember it's around the corner?", and the second utterance can be, "Let me check my text message, I texted with Dad a couple of weeks ago about this." In some implementations, an audio assistant of the system can automatically enter a multi-conversation mode in response to detecting more than one voice from the audio data. In some implementations, the audio assistant of the system can be automatically switched from the aforementioned hotword restricted listening state to the multi-conversation mode in response to detecting more than one voice from the audio data.

In various implementations, at block 503, the system can process the audio data to generate a first transcription for the first utterance and a second transcription for the second utterance. For example, the audio data capturing the first utterance and the second utterance can be segmented into a first audio segment that corresponds to the first utterance and a second audio segment that corresponds to the second utterance. In this example, the system can process the first audio segment that corresponds to the first utterance, to generate the first transcription for the first utterance. Similarly, the system can process the second audio segment that corresponds to the second utterance, to generate the second transcription for the second utterance.

In some implementations, the first audio segment and the second audio segment can be stored temporarily in a speech buffer, for further processing. In some implementation, alternatively, the system can process the audio data capturing the first and second utterances (instead of separately processing the first and second audio segments), to generate a transcription including the first transcription for the first utterance and the second transcription for the second utterance.

In some implementations, alternatively, instead of processing the audio data itself, the system can receive a first transcription for the first utterance and a second transcription for the second utterance, where the first transcription and the second transcription are acquired based on processing of the audio data.

In various implementations, at block 505A, the system can determine, based on processing of the audio data, a first account of a first user that spoke the first utterance. In various implementations, at block 505B, the system can determine, based on processing of the audio data, a second user account of a second user that spoke the second utterance. For instance, the system can process the first audio segment, e.g., using a speaker encoder, to generate a first speaker embedding for the first audio segment/first utterance. The first speaker embedding can be compared to a plurality of pre-stored speaker embeddings that are associated with the audio assistant, to determine that the first account matches the first speaker embedding. Similarly, the system can process the second audio segment, e.g., using a speaker encoder, to generate a second speaker embedding for the second audio segment/first utterance. The second speaker embedding can be compared to the plurality of pre-stored speaker embeddings, to determine that the second account matches the second speaker embedding.

In various implementations, at block 507A, the system can generate a first natural language description (e.g., "Alice says 'When is grandma's birthday, I remember it's around the corner?'") that includes one or more first attributes (e.g., "Alice") from the first user account and the first transcription for the first utterance (e.g., "When is grandma's birthday, I remember it's around the corner?"). In various implementations, at block 507B, the system can generate a second natural language description ("Bob says 'Let me check my text message, I texted with Dad a couple of weeks ago about this'") that includes one or more second attributes ("Bob") from the second user account and the second transcription ("Let me check my text message, I texted with Dad a couple of weeks ago about this.") for the second utterance.

In various implementations, the one or more first (or second) attributes from the first (or second) user account can include (or can be derived from), for instance, a user ID, a username, a nickname, a role within an organization or family, user preference data, user historical data, user profile, and/or other metadata associated with the first (or second) user account.

As a non-limiting example, the one or more first attributes from the first user account can be or can include a username (e.g., Alice) of the first user account, and the one or more second attributes from the second user account can be or can include a username (e.g., Bob) of the second user account. As another non-limiting example, the one or more first attributes from the first user account can be or can include a first preference description (e.g., favorite music is pop music) determined from user preference data stored in association with the first user account, and the one or more second attributes from the second user account can be or can include a second preference description (e.g., favorite singer is "MJ") determined from user preference data stored in association with the second user account.

In various implementations, at block 509, the system can generate, based on processing the first natural language description and the second natural language description, a response that is responsive to the first and second utterances. For example, the first natural language description (e.g., "Alice says, 'When is grandma's birthday, I remember it's around the corner?'") and the second natural language description ("Bob says, 'Let me check my text message, I texted with Dad last week about this.'") can be combined in order to generate a composite natural language description (e.g., "Alice says, 'When is grandma's birthday, I remember it's around the corner?' Bob says, 'Let me check my text message, I texted with Dad last week about this.'"). The composite natural language description can be sometimes referred to as "a generative model prompt". In this example, the system can generate the response, based on processing the generative model prompt using a generative model (e.g., the generative model 130 in FIG. 1A or FIG. 1B).

Continuing with the above example, the system can process the generative model prompt (also referred to as composite natural language description, e.g., "Alice says, 'When is grandma's birthday, I remember it's around the corner?' Bob says, 'Let me check my text message, I texted with Dad a couple of weeks ago about this.'"), using the trained generative model (e.g., a trained LLM), to generate an output. The output can be applied to generate a response such as "Do you want me to search the text messages and find grandma's birthday for you, Bob?"

As another example, the system can process the composite natural language description and additional information (or additional natural language content, such as, Bob's text messages from last week, if with Bob's permission), using the trained LLM, to generate an output from which a natural language response ("the message says grandma's birthday is next month, on September 9th") can be derived (and audibly rendered).

It's noted that, in some implementations, instead of processing the composite natural language description (and/or the additional information), the system can forward the natural language description (and/or the additional information) to the generative model (which can be a LLM external to the system) for processing using the generative model. In this case, the system can retrieve an output from the LLM after the processing, and generate the natural language response such as "Do you want me to search the text messages and find grandma's birthday for you, Bob?", or "the message says grandma's birthday is next month, on September 9th".

In various implementations, at block 511, the system can cause the natural language response to be rendered via the client device to the first and second users, in response to the first and second utterances. For example, the natural language response ("Do you want me to search the text messages for you, Bob?", or "the message says grandma's birthday is next month, on September 9th", etc.) can be rendered audibly in a customized voice, in response to the first utterance ("When is grandma's birthday, I remember it's around the corner?") and the second utterance ("Let me check my text message, I texted with Dad a couple of weeks ago about this.").

Figure 6:
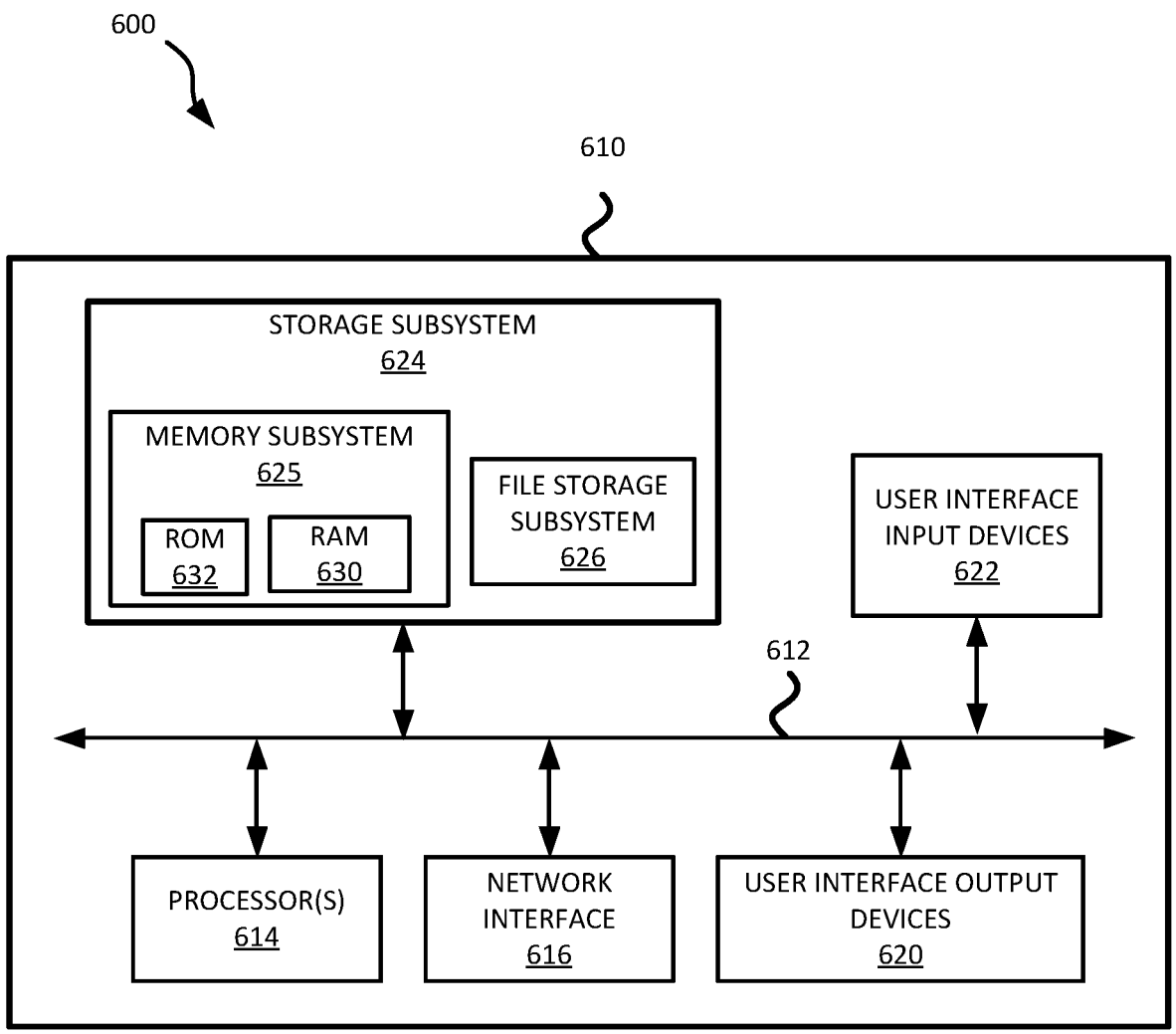
FIG. 6 illustrates an example architecture of a computing device, in accordance with various implementations.

FIG. 6 is a block diagram of an example computing device 610 that may optionally be utilized to perform one or more aspects of techniques described herein. In some implementations, one or more of a client computing device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1A.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple buses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

Different features of the examples can be combined or interchanged, unless they are not combinable nor interchangeable.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, and/or method described herein. In addition, any combination of two or more such features, systems, and/or methods, if such features, systems, and/or methods are not mutually inconsistent, is included within the scope of the present disclosure.

In various implementations, a computer-implemented method is provided, and includes: receiving, via a client device, audio data that captures a first utterance and a second utterance that are from different users; processing the audio data to generate a first transcription for the first utterance and a second transcription for the second utterance; determining, based on processing the audio data, a first account of a first user that spoke the first utterance; and determining, based on processing the audio data, a second user account of a second user that spoke the second utterance.

In some implementations, receiving, via the client device, the first utterance and the second utterance comprises: receiving the second utterance subsequent to the first utterance, the second utterance being received in response to the first utterance.

In some implementations, determining, based on processing the audio data, the first account of the first user that spoke the first utterance comprises: processing the audio data to determine a first speaker embedding that corresponds to the first utterance, and determining, based on the first speaker embedding, the first account of the first user that spoke the first utterance.

In some implementations, determining, based on the first speaker embedding, the first account of the first user that spoke the first utterance comprises: comparing the first speaker embedding to a plurality of pre-stored speaker embeddings to determine whether the first speaker embedding matches any of the pre-stored speaker embeddings, and in response to determining that the first speaker embedding matches a first pre-stored speaker embedding that is stored in association with the first account of the first user, determining that the first speaker embedding is associated with the first account of the first user. Alternatively, in response to determining that the first speaker embedding does not match any pre-stored speaker embedding, a guest label can be assigned to the first utterance.

In some implementations, determining that the first speaker embedding matches the first pre-stored speaker embedding stored in association with the first account comprises: determining a distance between the first speaker embedding and the first pre-stored speaker embedding in a virtual space, and determining that the first speaker embedding matches the first pre-stored speaker embedding based on the distance satisfying a distance threshold. The distance can be, for instance, a cosine distance or a Euclidean distance.

In some implementations, processing the audio data to determine the first speaker embedding that corresponds to the first utterance comprises: processing the audio data as input, using a trained machine learning model, to generate the first speaker embedding that corresponds to the first utterance. In some implementations, the trained machine learning model is a deep neural network, and the first speaker embedding is an intermediate output from a hidden layer of the deep neural network.

In some implementations, determining, based on processing the audio data, a second user account of a second user that spoke the second utterance comprises: processing the audio data to determine a second speaker embedding that corresponds to the second utterance, and determining, based on the second speaker embedding, the second account of the second user that spoke the second utterance.

In some implementations, determining, based on the second speaker embedding, the second account of the second user that spoke the second utterance comprises: comparing the second speaker embedding to a plurality of pre-stored speaker embeddings to determine whether the second speaker embedding matches any of the pre-stored speaker embeddings, and in response to determining that the second speaker embedding matches a second pre-stored speaker embedding that is stored in association with the second account of the second user, determining that the second speaker embedding is associated with the second account of the second user. Alternatively, in response to determining that the SECOND speaker embedding does not match any pre-stored speaker embedding, a guest label can be assigned to the second utterance.

In some implementations, determining that the second speaker embedding matches the second pre-stored speaker embedding stored in association with the second account comprises: determining a distance between the second speaker embedding and the second pre-stored speaker embedding in the virtual space, and determining that the second speaker embedding matches the second pre-stored speaker embedding based on the distance satisfying the distance threshold. The distance can be, for instance, a cosine distance or a Euclidean distance.

In some implementations, processing the audio data to determine the second speaker embedding that corresponds to the second utterance comprises: processing the audio data as input, using the trained machine learning model, to generate the second speaker embedding that corresponds to the second utterance. In some implementations, the trained machine learning model is a deep neural network, and the second speaker embedding is an intermediate output from a hidden layer of the deep neural network.

In various implementation, the method can further include: generating a first natural language description that includes one or more first attributes from the first user account and the first transcription for the first utterance; generating a second natural language description that includes one or more second attributes from the second user account and the second transcription for the second utterance; and generating, based on processing the first natural language description and the second natural language description using a trained generative model, a response that is responsive to the first and second utterances. The trained generative model can be, for instance, a large language model.

As a non-limiting example, the one or more first attributes from the first user account can include a username (or other identifier) of the first user account, or other attributes. Similarly, the one or more second attributes from the second user account include a username (or other identifier) of the second user account.

In some implementations, metadata associated with the first user account and/or the second user account can be retrieved, where the metadata can include or indicate user preferences (e.g., music preference for pop music) of the first user or the second user, user historical data of the first or second user (such as calendar entries entered with a particular period, e.g., last week or last month, and labeled as being public or shared), a user profile of the first or second user.

In some implementations, the one or more first attributes can be determined from the metadata associated with the first user account. In some implementations, the one or more second attributes can be determined from the metadata associated with the second user account.

In some implementations, generating the response that is responsive to the first and second utterances comprises: processing the first natural language description and the second natural language description to generate a composite natural language description, and processing the composite natural language description as input, using the trained generative mode, to generate output indicating the response that is responsive to the first and second utterances.

In some implementations, the method further includes: determining, based on the first transcription and the second transcription, additional natural language content from metadata associated with the first user account and/or the second user account. In these implementations, generating the response that is responsive to the first and second utterances comprises: processing the first natural language description, the second natural language, and the additional natural language content, to generate a composite natural language description, and processing the composite natural language description as input, using the trained generative mode, to generate output indicating the response that is responsive to the first and second utterances In various implementations, the method can further include: causing the response to be rendered via the client device to the first and second users, in response to the first and second utterances. In some implementations, the response is rendered audibly in a customized voice via the client device.

In some implementations, causing the response to be rendered via the client device to the first and second users, in response to the first and second utterances comprises: causing the response to be rendered via the client device, prior to receiving any additional utterance that is in addition to the first and second utterance.

In various implementations, another computer-implemented method is provided, and includes: receiving, via a client device, audio data that captures a first utterance and a second utterance that are from different users; processing the audio data to generate a first transcription for the first utterance and a second transcription for the second utterance; and determining, based on processing the audio data, whether the first utterance and the second utterance belongs to a registered user account of an audio assistant installed at the client device.

In various implementations, in response to determining that the first utterance belongs to a first user account of a first user registered with the audio assistant and that the second utterance does not belong to any registered user account of the audio assistant, the method further includes: determining one or more first attributes from the first user account; generating a first natural language description that includes the one or more first attributes from the first user account and the first transcription for the first utterance; generating, based on processing the first natural language description and the second transcription using a trained generative model, a response that is responsive to the first and second utterances; and causing the response to be rendered via the client device, in response to the first and second utterances.

In various implementations, the method further includes: in response to determining that the second utterance does not belong to any registered user account of the audio assistant, generating a second natural language description that includes the second transcription for the second utterance and a guest label for the second transcription. In these implementations, generating the response is based on processing the first natural language description and the second natural language description using the trained generative model.

In various implementations, a further computer-implemented method is provided, and includes: receiving, via a client device, audio data that captures a first utterance and a second utterance that are from different users; processing the audio data to segment the audio data into a first audio segment corresponding to the first utterance and a second audio segment corresponding to the second utterance; generating, based on the first audio segment, a first transcription for the first utterance and a first speaker embedding for the first utterance; generating, based on the second audio segment, a second transcription for the second utterance and a second speaker embedding for the second utterance; determining, based on the first speaker embedding, a first account of a first user that spoke the first utterance; determining, based on the second speaker embedding, a second user account of a second user that spoke the second utterance; generating a first natural language description that includes one or more first attributes from the first user account and the first transcription for the first utterance; generating a second natural language description that includes one or more second attributes from the second user account and the second transcription for the second utterance; generating, based on processing the first natural language description and the second natural language description using a trained generative model, a response that is responsive to the first and second utterances; and causing the response to be rendered via the client device to the first and second users, in response to the first and second utterances.

By using the audio assistant (as described in various implementations above) to provide a response that is responsive to multiple utterances from different users (or a portion of a conversation that involves multiple users) instead of rigidly responding to every single utterance the audio assistant receives, the consumption of computing resources, battery resources, and/or network resources can be reduced, while the conversation that involves the multiple users (e.g., the aforementioned first and second users) can be enhanced with additional information that appropriately supplements information reflected in the multiple utterances.

What is claimed is:

1. A computer-implemented method, comprising:
  receiving, via a client device, audio data that captures a first utterance and a second utterance that are from different users;
  processing the audio data to generate a first transcription for the first utterance and a second transcription for the second utterance;
  determining, based on processing the audio data, a first account of a first user that spoke the first utterance;
  determining, based on processing the audio data, a second user account of a second user that spoke the second utterance;
  generating a first natural language description that includes one or more first attributes from the first user account and the first transcription for the first utterance;
  generating a second natural language description that includes one or more second attributes from the second user account and the second transcription for the second utterance;
  generating, based on processing the first natural language description and the second natural language description using a trained generative model, a response that is responsive to the first and second utterances, wherein generating the response that is responsive to the first and second utterances comprises:
    processing the first natural language description and the second natural language description to generate a composite natural language description; and
    processing the composite natural language description as input, using the trained generative model, to generate output indicating the response that is responsive to the first and second utterances; and
  causing the response to be rendered via the client device to the first and second users, in response to the first and second utterances.

2. The method of claim 1, wherein determining, based on processing the audio data, the first account of the first user that spoke the first utterance comprises:
  processing the audio data to determine a first speaker embedding that corresponds to the first utterance; and
  determining, based on the first speaker embedding, the first account of the first user that spoke the first utterance.

3. The method of claim 2, wherein determining, based on the first speaker embedding, the first account of the first user that spoke the first utterance comprises:
  comparing the first speaker embedding to a plurality of pre-stored speaker embeddings to determine whether the first speaker embedding matches any of the pre-stored speaker embeddings; and
  in response to determining that the first speaker embedding matches a first pre-stored speaker embedding that is stored in association with the first account of the first user, determining that the first speaker embedding is associated with the first account of the first user.

4. The method of claim 3, wherein determining that the first speaker embedding matches the first pre-stored speaker embedding stored in association with the first account comprises:
  determining a distance between the first speaker embedding and the first pre-stored speaker embedding in a virtual space, and
  determining that the first speaker embedding matches the first pre-stored speaker embedding based on the distance satisfying a distance threshold.

5. The method of claim 4, wherein the distance is a cosine distance or a euclidean distance.

6. The method of claim 2, wherein processing the audio data to determine the first speaker embedding that corresponds to the first utterance comprises:
processing the audio data as input, using a trained machine learning model, to
generate the first speaker embedding that corresponds to the first utterance.

7. The method of claim 6, wherein the trained machine learning model is a deep neural network, and the first speaker embedding is an output from a hidden layer of the deep neural network.

8. The method of claim 1, wherein determining, based on processing the audio data, a second user account of a second user that spoke the second utterance comprises:
processing the audio data to determine a second speaker embedding that corresponds to the second utterance; and
determining, based on the second speaker embedding, the second account of the second user that spoke the second utterance.

9. The method of claim 1, wherein the one or more first attributes from the first user account include a username of the first user account, and the one or more second attributes from the second user account include a username of the second user account.

10. The method of claim 1, further comprising:
determining, based on the first transcription and the second transcription, additional natural language content from metadata associated with the first user account or the second user account.

11. The method of claim 10, wherein generating the response that is responsive to the first and second utterances comprises:
processing the first natural language description, the second natural language description, and the additional natural language content, to generate the composite natural language description.

12. The method of claim 1, wherein the response is rendered audibly in a customized voice via the client device.

13. The method of claim 1, wherein receiving, via the client device, the first utterance and the second utterance comprises:
receiving the second utterance subsequent to the first utterance, the second utterance being received in response to the first utterance.

14. The method of claim 1, wherein causing the response to be rendered via the client device to the first and second users, in response to the first and second utterances comprises:
causing the response to be rendered via the client device, prior to receiving any additional utterance that is in addition to the first and second utterance.

15. The method of claim 1, wherein the trained generative model is a large language model.

16. A computer-implemented method, comprising:
receiving, via a client device, audio data that captures a first utterance and a second utterance that are from different users;
processing the audio data to segment the audio data into a first audio segment corresponding to the first utterance and a second audio segment corresponding to the second utterance;
generating, based on the first audio segment, a first transcription for the first utterance and a first speaker embedding for the first utterance;
generating, based on the second audio segment, a second transcription for the second utterance and a second speaker embedding for the second utterance;
determining, based on the first speaker embedding, a first account of a first user that spoke the first utterance;
determining, based on the second speaker embedding, a second user account of a second user that spoke the second utterance;
generating a first natural language description that includes one or more first attributes from the first user account and the first transcription for the first utterance;
generating a second natural language description that includes one or more second attributes from the second user account and the second transcription for the second utterance;
generating, based on processing the first natural language description and the second natural language description using a trained generative model, a response that is responsive to the first and second utterances, wherein generating the response that is responsive to the first and second utterances comprises:
processing the first natural language description and the second natural language description to generate a composite natural language description; and
processing the composite natural language description as input, using the trained generative model, to generate output indicating the response that is responsive to the first and second utterances; and
causing the response to be rendered via the client device to the first and second users, in response to the first and second utterances.

* * * * *